F. F. KAESTNER.
STORM LAMP.
APPLICATION FILED JUNE 10, 1914.

1,176,566.

Patented Mar. 21, 1916.
2 SHEETS—SHEET 1.

Witnesses:
F. S. Hurst.

Inventor
Franz F. Kaestner
by
James L. Norris
Attorney

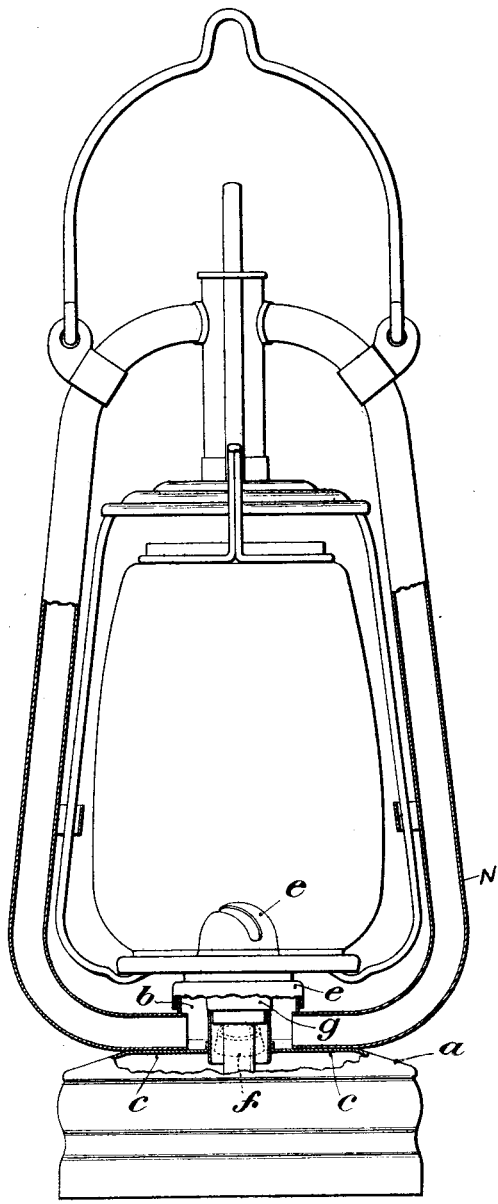

UNITED STATES PATENT OFFICE.

FRANZ FRIEDRICH KAESTNER, OF ERFURT, GERMANY.

STORM-LAMP.

1,176,566.  Specification of Letters Patent.  Patented Mar. 21, 1916.

Application filed June 10, 1914. Serial No. 844,246.

*To all whom it may concern:*

Be it known that I, Franz Friedrich Kaestner, a subject of the German Emperor, residing at Erfurt, Kingdom of Prussia, Germany, have invented certain new and useful Improvements in or Relating to Storm-Lamps, of which the following is a specification.

My invention relates to a storm lamp with air circulation pipes arranged so that the burner pipe with the burner cap placed thereover, communicates directly with the air through lateral openings, and the characteristic of this lamp is that air is admitted through conduits provided in trough-like recesses in the cover of the fuel tank, the said conduits being covered in the known manner with sieves or filters at the inlet or outlet. The fuel tank is also strengthened by the troughs in question, and thus protected from bending.

Figure 1:
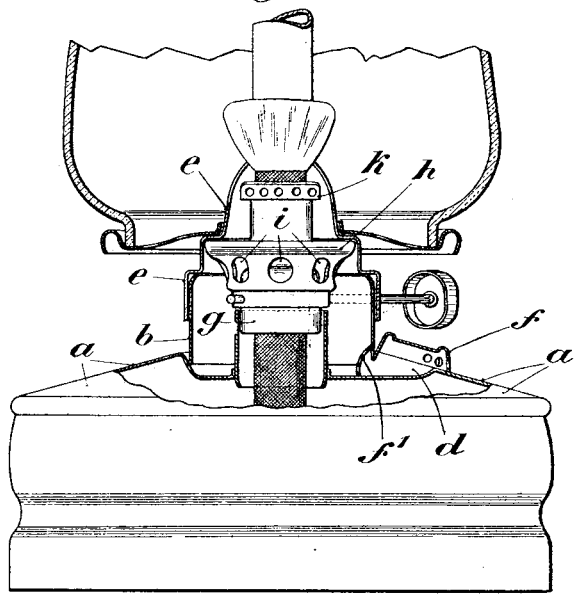
Figure 2:
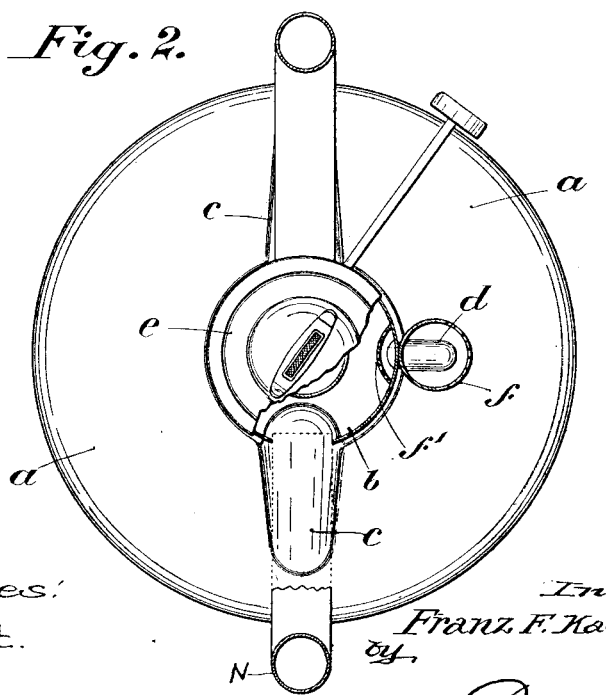

Figure 1 is a sectional elevation of the lower portion of a lantern embodying the features of the invention. Fig. 2 is a broken top plan view of the lower portion of the lantern. Fig. 3 is a sectional elevation of the complete lantern and particularly illustrating the disposition of the air supply pipes.

$a$ is the cover of the fuel tank rising toward the burner pipe $b$. The cover $a$ of the fuel tank is formed with the troughs $c$ in the usual manner for the insertion of the air supply pipes N which communicate with the burner pipe $b$. In addition to the said troughs $c$, the cover is also provided with one or more further troughs $d$ which guide the air toward the interior of the burner pipe $b$ and of the burner cap $e$ placed thereover. The troughs $d$ are suitably covered by sieves or perforated caps $f$, but nevertheless admit air. The inner opening of the troughs $d$ within the burner pipe $b$ can also be closed by sieves or filters $f'$, so that the air admitted is correspondingly subdivided into smaller currents. The burner $g$ is provided in the usual manner with the funnel $h$ through the air openings $i$ of which air passes to the burner head $k$.

Any desired number of troughs can be formed in the upper surface of the fuel tank cover $a$, and therefore any desired number of air supply conduits to the burner pipe can be produced.

If such a lamp is subjected to a shock, and the air is rarefied in the interior of the burner cap between the burner head $k$ and the cap $e$, air can pass through the troughs $d$ toward the interior of the burner pipe $b$ and the cap $e$, and this air entering through the filter or filters $f$ $f'$, overcomes the rarefication of air in the interior of the flat burner cap $e$.

What I claim is:

1. In a lamp, the combination with a fuel tank having a cover therefor raised toward the center thereof, a burner supported on said cover, a burner pipe supported on the raised portion of said cover and surrounding said burner, said pipe being formed with lateral openings therein, air circulating pipes introduced in said openings, said raised portion of the cover being depressed to form radial grooves underlying the lower end of said pipe to connect the interior of said pipe with the atmosphere, and filtering means obstructing said last-mentioned passages.

2. In a lamp, and in combination, a fuel tank having a cover therefor raised toward the center thereof, a burner supported on said cover and a burner pipe surrounding said burner and having its lower end supported on the raised portion of said cover, said raised portion of the cover being depressed to form radial grooves underlying the lower end of said pipe to connect the interior of the latter with the atmosphere.

In testimony whereof I have hereunto set my hand in presence of two subscribing witnesses.

FRANZ FRIEDRICH KAESTNER.

Witnesses:
 Alfred Hoffmann,
 Ferd Kaestner.

Copies of this patent may be obtained for five cents each, by addressing the "Commissioner of Patents, Washington, D. C."